US 11,254,381 B2

(12) United States Patent
Rawas et al.

(10) Patent No.: US 11,254,381 B2
(45) Date of Patent: Feb. 22, 2022

(54) MANUFACTURING CELL BASED VEHICLE MANUFACTURING SYSTEM AND METHOD

(71) Applicant: DIVERGENT TECHNOLOGIES, INC., Los Angeles, CA (US)

(72) Inventors: Oussama Rawas, Allen, TX (US); Alex James Hamade, Redondo Beach, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 100 days.

(21) Appl. No.: 15/925,672

(22) Filed: Mar. 19, 2018

(65) Prior Publication Data

US 2019/0283824 A1    Sep. 19, 2019

(51) Int. Cl.
*B62D 65/02*    (2006.01)
*B23P 19/04*    (2006.01)
(Continued)

(52) U.S. Cl.
CPC .......... *B62D 65/026* (2013.01); *B05C 5/0216* (2013.01); *B23P 19/04* (2013.01);
(Continued)

(58) Field of Classification Search
CPC ............ B23K 37/0443; B23K 37/0452; B23K 37/0461; B25J 9/0009; B25J 9/0027;
(Continued)

(56) References Cited

U.S. PATENT DOCUMENTS 2,884,242 A * 4/1959 Fleming ............. B23K 37/0461
269/61
3,370,723 A * 2/1968 Czarnecki ............. B65G 37/00
414/567
(Continued)

FOREIGN PATENT DOCUMENTS

CN      103801888 A  *  5/2014
JP       57199718 A  *  12/1982  ............. B65G 47/61
(Continued)

OTHER PUBLICATIONS

US 9,202,136 B2, 12/2015, Schmidt et al. (withdrawn)
(Continued)

*Primary Examiner* — Jacob J Cigna
(74) *Attorney, Agent, or Firm* — Arent Fox LLP

(57) ABSTRACT

Manufacturing cell based vehicle manufacturing systems and methods for a wide variety of vehicles are disclosed. In one aspect, a manufacturing cell configured for assembling a frame of a vehicle is disclosed. The manufacturing cell includes a positioner, a robot carrier and a robot. The positioner is configured to receive a fixture table configured to hold the frame. The robot carrier includes a vertical lift. The robot is configured to assemble the frame. The positioner is configured to support the frame in a vertical position during an assembling process. In another aspect of the disclosure, a system for manufacturing a vehicle based on a manufacturing cell is disclosed. In another aspect of the disclosure, a method for manufacturing a vehicle based on a manufacturing cell is disclosed.

41 Claims, 7 Drawing Sheets

(51) Int. Cl.
  *B25J 15/00* (2006.01)
  *B62D 27/02* (2006.01)
  *F16B 11/00* (2006.01)
  *B05C 5/02* (2006.01)
  *B29C 65/48* (2006.01)

(52) U.S. Cl.
  CPC ........... *B25J 15/0014* (2013.01); *B29C 65/48* (2013.01); *B62D 27/026* (2013.01); *F16B 11/006* (2013.01); *Y10S 901/31* (2013.01)

(58) Field of Classification Search
  CPC . B25J 9/0096; B25J 9/04; B60S 13/00; B65G 47/61
  See application file for complete search history.

(56) References Cited

U.S. PATENT DOCUMENTS

| | | | |
|---|---|---|---|
| 3,905,495 A * | 9/1975 | Wayne | B65G 47/61 414/567 |
| 4,238,169 A * | 12/1980 | DePriester | B62D 65/18 294/103.1 |
| 4,811,891 A * | 3/1989 | Yamaoka | B23K 37/047 228/182 |
| 5,125,149 A * | 6/1992 | Inaba | B23P 19/001 198/341.05 |
| 5,203,226 A | 4/1993 | Hongou et al. | |
| 5,258,598 A * | 11/1993 | Alborante | B23K 37/047 219/86.41 |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,193,142 B1 * | 2/2001 | Segawa | B23K 37/047 219/148 |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,339,874 B2 * | 1/2002 | Segawa | B62D 65/02 29/824 |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,899,377 B2 * | 5/2005 | Ghuman | B23P 21/004 29/429 |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,459,656 B2 * | 12/2008 | Yamaoka | B23K 37/0443 219/158 |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,798,316 B2 * | 9/2010 | Powers | B65G 37/02 198/842 |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,442,686 B2 * | 5/2013 | Saito | B25J 9/06 700/245 |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Fen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwarzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,517,895 B2 * | 12/2016 | Bacalia | B25J 9/00 |
| 9,525,262 B2 | 12/2016 | Stuart et al. | |
| 9,533,526 B1 | 1/2017 | Nevins | |
| 9,534,311 B2 * | 1/2017 | Clifford | C25D 17/06 |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Voung et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |

(56) References Cited

U.S. PATENT DOCUMENTS

| | | |
|---|---|---|
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Garni et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Ausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,369 B1 * | 7/2018 | Carlisle .................... B25J 9/12 |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,168,686 B2 * | 1/2019 | Choi .................... B62D 65/024 |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |

(56) References Cited

U.S. PATENT DOCUMENTS

| | | |
|---|---|---|
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,493,883 B2 | 12/2019 | Mizobata et al. |
| 10,737,817 B2 * | 8/2020 | Rogers ............... B65G 1/0435 |
| 2001/0047591 A1 * | 12/2001 | Yamaoka ........... B23K 37/0426 |
| | | 29/897.2 |
| 2004/0056498 A1 * | 3/2004 | Ghuman ............. B23P 21/004 |
| | | 296/1.01 |
| 2006/0108783 A1 | 5/2006 | Ni et al. |
| 2006/0245901 A1 * | 11/2006 | Yamaoka ........... B23K 37/0443 |
| | | 414/692 |
| 2008/0168639 A1 * | 7/2008 | Otake .................... B25J 5/02 |
| | | 29/56.6 |
| 2008/0251351 A1 * | 10/2008 | Powers ................ B65G 35/06 |
| | | 198/402 |
| 2009/0003975 A1 * | 1/2009 | Kuduvalli ........... A61N 5/1049 |
| | | 414/146 |
| 2009/0249606 A1 * | 10/2009 | Diez ..................... B23K 11/11 |
| | | 29/428 |
| 2013/0309055 A1 * | 11/2013 | Yoshinaga .............. B25J 18/04 |
| | | 414/680 |
| 2014/0277669 A1 | 9/2014 | Nardi et al. |
| 2015/0239067 A1 * | 8/2015 | Bricker ................... B23K 9/02 |
| | | 228/105 |
| 2017/0050677 A1 | 2/2017 | Czinger et al. |
| 2017/0113344 A1 | 4/2017 | Schonberg |
| 2017/0341309 A1 | 11/2017 | Piepenbrock et al. |
| 2017/0341553 A1 | 11/2017 | Mizobata et al. |

FOREIGN PATENT DOCUMENTS

| | | | | |
|---|---|---|---|---|
| JP | 62238099 A | * | 10/1987 | |
| JP | S63260681 A | | 10/1988 | |
| JP | H02117481 A | | 5/1990 | |
| JP | H02 220775 A | | 9/1990 | |
| JP | H05069249 A | | 3/1993 | |
| JP | H0755667 B2 | * | 6/1995 | |
| JP | 2008-074251 A | | 4/2008 | |
| JP | 2012135818 A | | 7/2012 | |
| KR | 100775147 B1 | * | 11/2007 | |
| KR | 20130050026 A | * | 5/2013 | ......... B23K 37/0443 |
| WO | 1996036455 A1 | | 11/1996 | |
| WO | 1996036525 A1 | | 11/1996 | |
| WO | 1996038260 A1 | | 12/1996 | |
| WO | WO-0071292 A1 | * | 11/2000 | .............. B23Q 3/18 |
| WO | 2003024641 A1 | | 3/2003 | |
| WO | 2004108343 A1 | | 12/2004 | |
| WO | 2005093773 A1 | | 10/2005 | |
| WO | 2007003375 A1 | | 1/2007 | |
| WO | 2007110235 A1 | | 10/2007 | |
| WO | 2007110236 A1 | | 10/2007 | |
| WO | 2008019847 A1 | | 2/2008 | |
| WO | 2007128586 A3 | | 6/2008 | |
| WO | 2008068314 A2 | | 6/2008 | |
| WO | 2008086994 A1 | | 7/2008 | |
| WO | 2008087024 A1 | | 7/2008 | |
| WO | WO-2008098605 A1 | * | 8/2008 | ............. B25J 18/02 |
| WO | 2008107130 A1 | | 9/2008 | |
| WO | 2008138503 A1 | | 11/2008 | |
| WO | 2008145396 A1 | | 12/2008 | |
| WO | 2009083609 A2 | | 7/2009 | |
| WO | 2009098285 A1 | | 8/2009 | |
| WO | 2009112520 A1 | | 9/2009 | |
| WO | 2009135938 A1 | | 11/2009 | |
| WO | 2009140977 A1 | | 11/2009 | |
| WO | 2010125057 A2 | | 11/2010 | |
| WO | 2010125058 A1 | | 11/2010 | |
| WO | WO-2010125057 A2 | * | 11/2010 | ........... B21D 39/021 |
| WO | 2010142703 A2 | | 12/2010 | |
| WO | 2011032533 A1 | | 3/2011 | |
| WO | 2014016437 A1 | | 1/2014 | |
| WO | 2014187720 A1 | | 11/2014 | |
| WO | 2014195340 A1 | | 12/2014 | |

(56) References Cited

FOREIGN PATENT DOCUMENTS

| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
WO-0071292-A1 Machine Translation (Year: 2000).*
International Search Report & Written Opinion received in PCT/US2019/021544 dated Jun. 28, 2019.
Supplementary European Search Report issued for corresponding application 19772033.7, dated Dec. 6, 2021, 45 pages.
English language translation of the Subject of the Invention of JP publication No. H0569249A, publication date Nov. 22, 2012, EPO, 3 pages.
English language translation of the Subject of the Invention of JP Publication No. H02117481A, © TXPMTJEA publication date May 1, 1990, EPO 5 pages.
English language translation of the Subject of the Invention of JP Publication No. S63260681A, © TXPMTJEA publication date Oct. 27, 1988, EPO, 1 page.
English language translation of the Subject of the Invention of JP Publication No. H02117481A, © TXPJPEA, Thomson, publication date Nov. 22, 2021, 21 pages.
English language translation of the Subject of the Invention of JP Publication No. 2012135818A, EPO, © TXPJPEA publication date Jul. 19, 2012, 20 pages.
English language translation of the Subject of the Invention of JP Publication No. H02220775A, EPO, © TXPJPEA publication date Sep. 3, 1990, 5 pages.

* cited by examiner

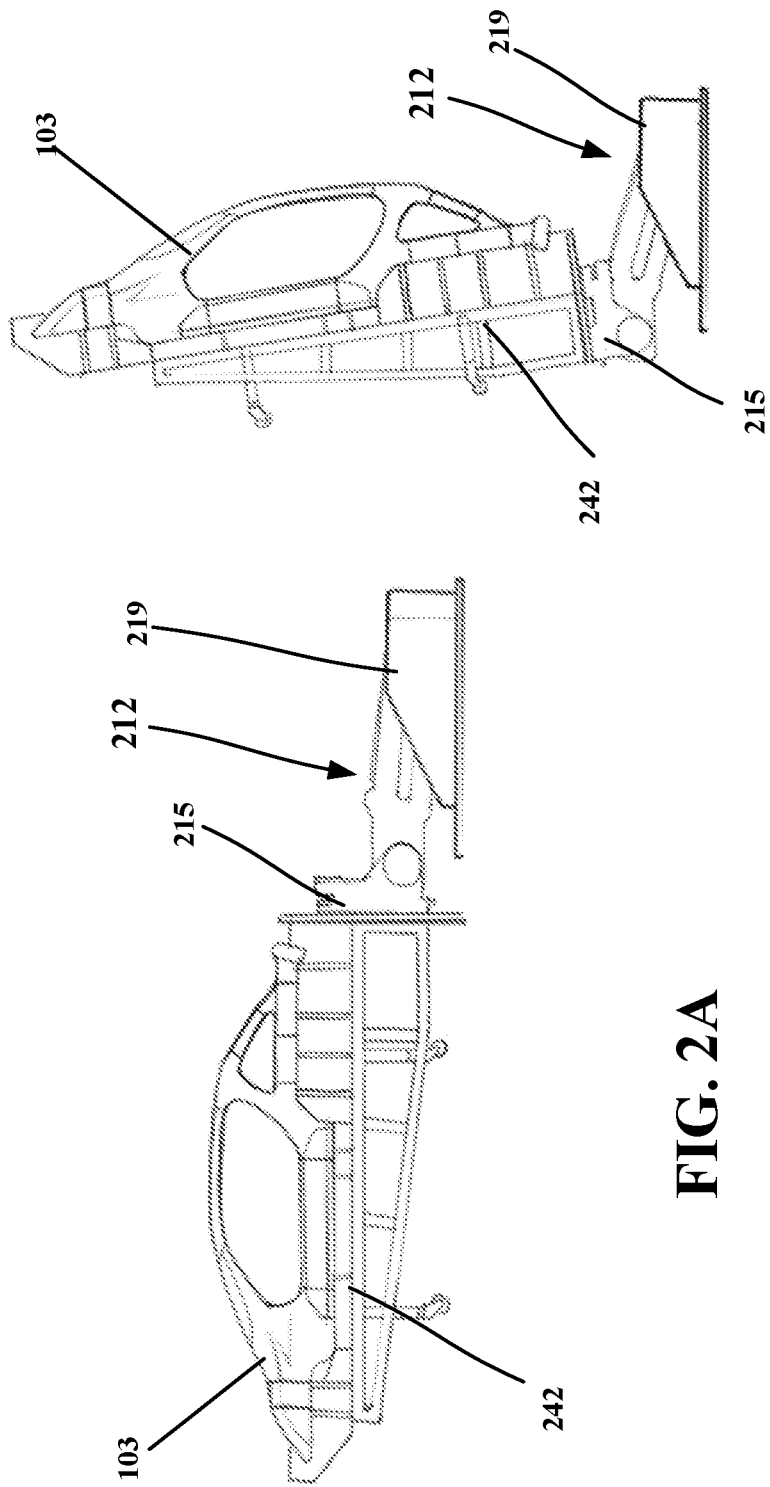

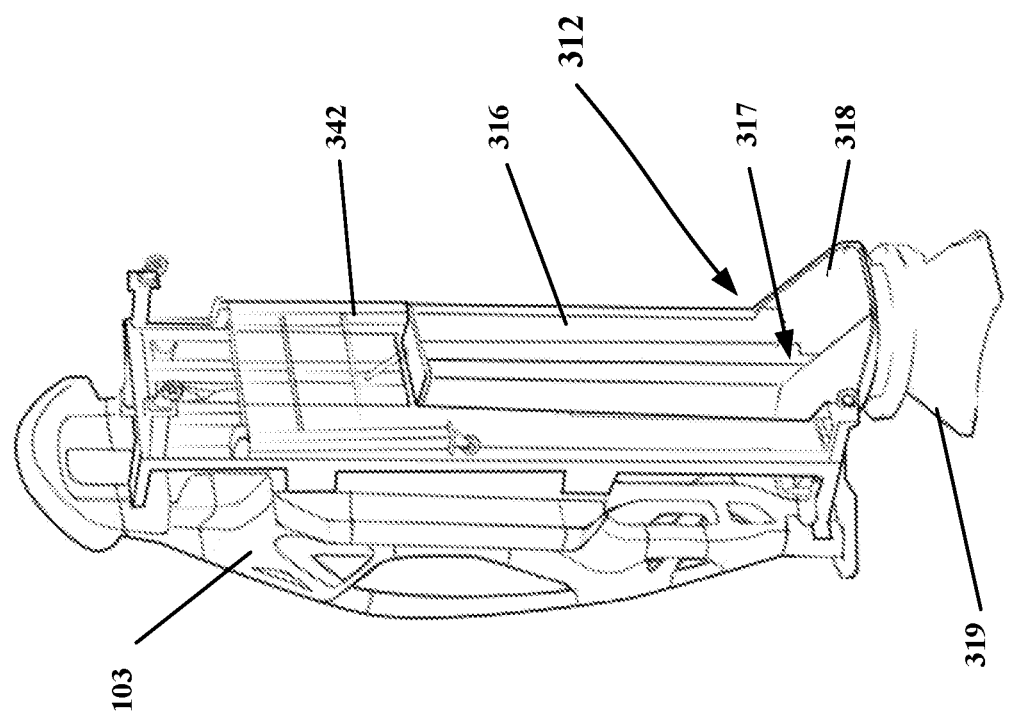

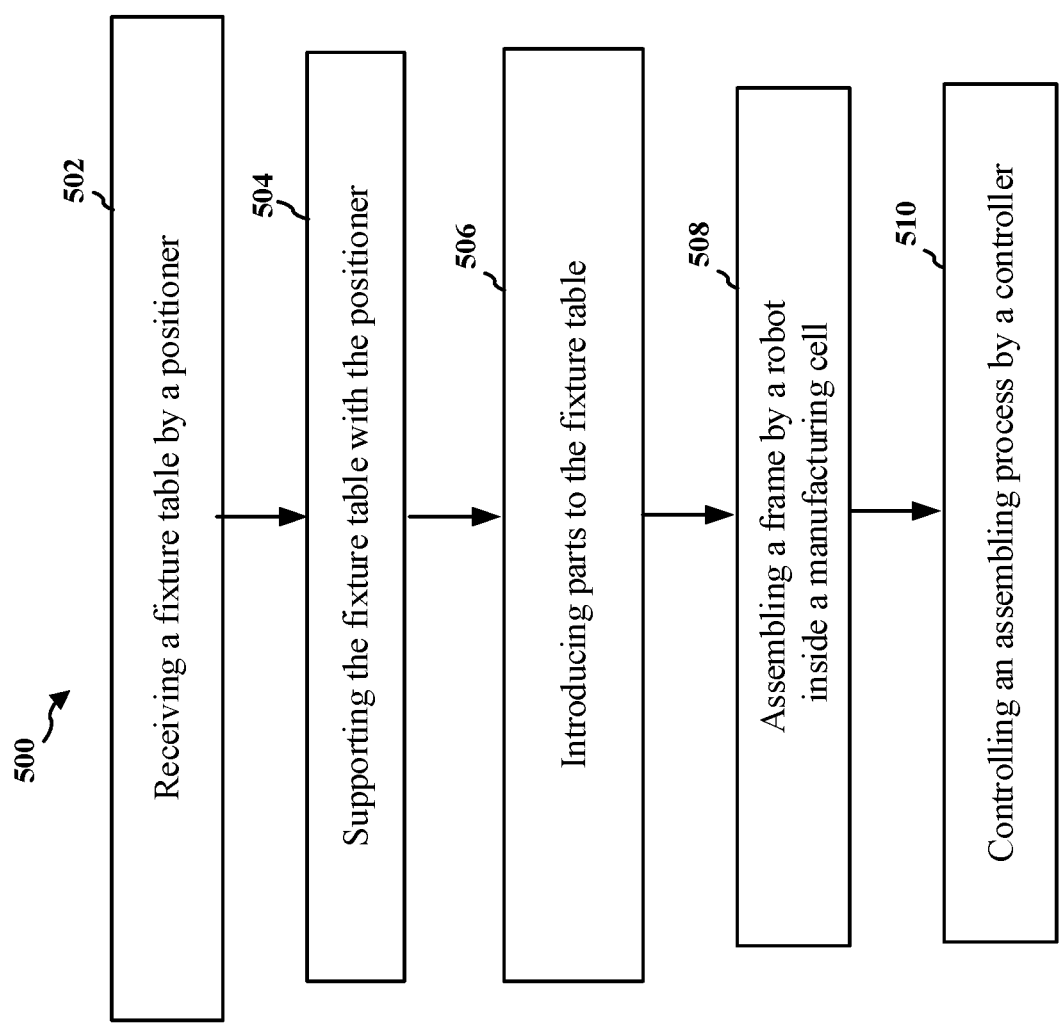

MANUFACTURING CELL BASED VEHICLE MANUFACTURING SYSTEM AND METHOD

INCORPORATION BY REFERENCE

All publications and patent applications mentioned in this specification are incorporated herein by reference in their entirety to the same extent as if each individual publication or patent application was specifically and individually indicated to be incorporated by reference, including: U.S. patent application Ser. No. 15/253,826, titled "SYSTEMS AND METHODS FOR VEHICLE SUBASSEMBLY AND FABRICATION", filed on Aug. 31, 2016; which is a continuation-in-part of U.S. Pat. No. 9,895,747, titled "SYSTEMS AND METHODS FOR FABRICATING JOINT MEMBERS", filed on Jun. 30, 2015; and U.S. Pat. No. 9,884,663, titled "MODULAR FORMED NODES FOR VEHICLE CHASSIS AND THEIR METHODS OF USE", filed on May 15, 2015.

BACKGROUND

Field

The present disclosure generally relates to manufacturing systems and methods for a wide variety of vehicles, and more specifically to manufacturing cell based manufacturing systems and methods for a wide variety of vehicles.

Background

The automotive industry has been evolving over the years. Body-on-frame is the original method for assembling a car or truck. The body and frame are two separate entities. The frame is a ladder frame on which both the body and drivetrain are installed. However, body-on-frame vehicles are heavier, which results in worse fuel efficiency. Also, the rigidity creates a noticeably harsher ride.

Throughout the 1930s and 1940s, the unibody method began to gain popularity. Currently, most vehicles are designed by the unibody method, which is now considered standard in the industry. The unibody method integrates the frame into the body construction. Different parts of the vehicle are welded, riveted and screwed together to create its body structure. Unibody construction cuts significant weight out of the vehicle, allowing for better fuel economy. It is generally considered safe, since the entire body can absorb the energy forces in a crash. However, introducing a new unibody model is very expensive and has a very long Research and Development (R&D) cycle, because the entire design of the vehicle and the corresponding assembly line need to be changed. Further, since the unibody design incorporates the frame into the passenger shell, serious accidents become very costly to repair.

Space frame is another method which is a development of the earlier ladder frame. In a space frame chassis, the suspension, engine, and body panels are attached to a three-dimensional skeletal frame, and the body panels have little or no structural function. Advantages of space frame chassis construction include better torsional rigidity that is required in high performance vehicles. The modular design of the space frame can further allow customized design and easy new product development. However, a conventional space frame chassis includes many parts, which are manually welded or glued together. The process is very time consuming and labor intensive. Due to the complicated manufacturing process, conventional space frame chassis platform is predominantly used for high performance and specialty market cars.

There is a need to develop new manufacturing systems and methods that are modular in design and flexible for manufacturing a wide variety of vehicles, with high robot utilization and automatic assembling process, while saving weight and space, and enabling easier service and repair.

SUMMARY

Manufacturing cell based manufacturing systems and methods for a wide variety of vehicles will be described more fully hereinafter with reference to various illustrative aspects of the present disclosure.

In one aspect of the disclosure, a manufacturing cell configured for assembling a frame of a vehicle is disclosed. The manufacturing cell includes a positioner, a robot carrier and a robot. The positioner is configured to receive a fixture table, where the fixture table is configured to hold the frame. The robot carrier includes a vertical lift, where the vertical lift includes a vertical column and a shelf, where the shelf is movably attached to the vertical column and movable along a vertical direction. The robot is mounted on the shelf and configured to assemble the frame. The positioner is configured to support the frame in a vertical position during an assembling process of the frame.

In another aspect of the disclosure, a system for manufacturing a vehicle based on a manufacturing cell is disclosed. The system includes a fixture table configured to hold a frame of the vehicle and a manufacturing cell configured for assembling the frame. The manufacturing cell includes a positioner configured to receive the fixture table, a robot carrier, a robot, and a controller. The robot is mounted on the robot carrier and configured to assemble the frame. The controller is configured to control an assembling process of the frame. The positioner is configured to support the frame during the assembling process of the frame. For example, the positioner may be configured to support the frame in a vertical position during the assembling process. The robot carrier may include a vertical lift, and where the vertical lift includes a vertical column and a shelf movably attached to the vertical column, where the shelf is movable along a vertical direction, and where the robot is mounted on the shelf. The robot carrier may include a base, where the base has a base central axis, wherein the base is configured to be rotatable around the base central axis. The system may include the frame, where the frame includes a plurality of connecting components and a plurality of joint members, where each joint member is sized and shaped to mate with at least a subset of the plurality of connecting components to form a three-dimensional frame structure.

In another aspect of the disclosure, a method for manufacturing a vehicle based on a manufacturing cell is disclosed. The method for manufacturing a vehicle includes a step of receiving a fixture table by a positioner. The method can include supporting the fixture table with the positioner. The method can further include introducing parts to the fixture table. The method include a step of assembling a frame of the vehicle using the parts by a robot in an assembling process inside a manufacturing cell. The method further includes a step of controlling the assembling process by a controller. For example, the step of supporting the fixture table with the positioner includes supporting the fixture table in a vertical position with the positioner during the assembling process.

It will be understood that other aspects of manufacturing a vehicle based on a manufacturing cell thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of manufacturing cell based manufacturing systems and methods for a wide variety of vehicles thereof will now be presented in the detailed description by way of example, and not by way of limitation, in the accompanying drawings, wherein:

FIG. 2A illustrates a schematic of an example positioner coupled to a fixture table, when the fixture table is in one position, according to one embodiment of this disclosure.

FIG. 2B illustrates a schematic of the example positioner coupled to the fixture table, when the fixture table in another position.

FIG. 3A illustrates a schematic of another example positioner coupled to a fixture table, when the fixture table is holding a frame in a vertical position, according to another embodiment of this disclosure.

FIG. 5 illustrates a flow diagram of a method for manufacturing a vehicle based on a manufacturing cell, according to one embodiment of this disclosure.

DETAILED DESCRIPTION

Figure 1A:
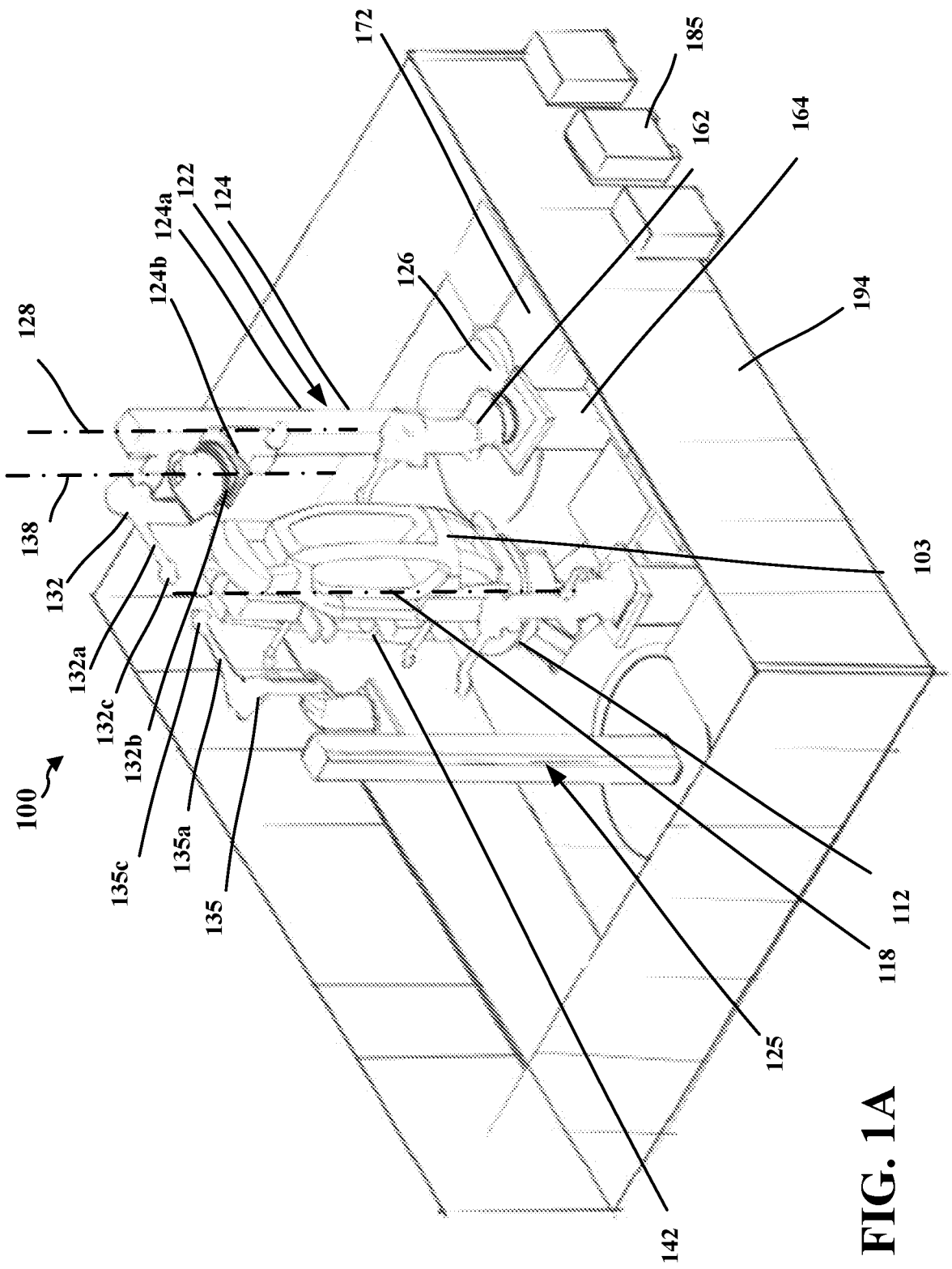
FIG. 1A illustrates an example of a schematic of a manufacturing cell configured for assembling a frame of a vehicle, according to one embodiment of this disclosure.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed to manufacturing cell based systems and methods for manufacturing a vehicle. The term "vehicle" used throughout this disclosure means a transport structure used for transporting people or goods, including automobiles, trucks, trains, metro systems, boats, ships, watercrafts, aircrafts, helicopters, motorcycles, bicycles, space crafts, and the like. The manufacturing cell based systems and methods disclosed herein can be used to manufacture a wide variety of vehicles, including, but not being limited to, automobiles, water vessels, aircrafts and human powered vehicles, etc. The term "frame" used throughout this disclosure means a supporting structure of a vehicle to which other components are attached. Examples of a frame include, but not being limited to, a chassis, a space frame, a three-dimensional frame, an internal frame, an outer frame, a partially inner and partially outer frame, a supporting component/structure, or supporting components/structures, of a vehicle.

This disclosure presents a system for manufacturing a vehicle based on a manufacturing cell. The system includes a fixture table configured to hold a frame of the vehicle and a manufacturing cell configured for assembling the frame. The manufacturing cell includes a positioner configured to receive the fixture table, a robot carrier, a robot and a controller. The robot is mounted on the robot carrier and configured to assemble the frame. The controller is configured to control an assembling process of the frame. The positioner is configured to support the frame during the assembling process of the frame. For example, the positioner may be configured to support the frame in a vertical position during the assembling process. The robot carrier may include a vertical lift. The vertical lift includes a vertical column and a shelf movably attached to the vertical column. The shelf is movable along a vertical direction, and where the robot is mounted on the shelf. The robot carrier may include a base, where the base has a base central axis, wherein the base is configured to be rotatable around the base central axis. The system may include the frame. The system can serve as a flexible universal constructor, with high robot utilization.

This disclosure presents a manufacturing cell configured for assembling a frame of a vehicle. The manufacturing cell includes a positioner, a robot carrier and a robot. The positioner is configured to receive a fixture table, where the fixture table is configured to hold the frame. The robot carrier includes a vertical lift, where the vertical lift includes a vertical column and a shelf, where the shelf is movably attached to the vertical column and movable along a vertical direction. The robot is mounted on the shelf and configured to assemble the frame. The positioner is configured to support the frame in a vertical position during an assembling process of the frame.

Advantageously, the systems and methods disclosed herein are modular in design and flexible for manufacturing a wide variety of vehicles. New products only need minimal retooling, resulting in significantly lower new product development cost, and much shorter R&D cycles. In addition, the systems and methods offer smaller footprint, and higher space utilization. Notably, the manufacturing cell based systems and methods have high robot utilization, and automatic assembly processes, which lends itself useful for high volume production of vehicles. Thus, the manufacturing cell based systems and methods can significantly lower the manufacturing cost of the vehicles.

FIG. 1A illustrates an example of a manufacturing cell 100 of a system for manufacturing a vehicle. The manufacturing cell 100 is configured for assembling a frame 103 (see FIG. 1B) of a vehicle. The manufacturing cell 100 includes a positioner 112, a robot carrier 122 and a robot 132. The positioner 112 is configured to receive a fixture table 142, where the fixture table 142 is configured to hold the frame 103. The term "frame" may also be referred as "space frame", "smart frame", "chassis", "supporting structure", or "supporting components" of a vehicle.

As shown in FIG. 1A, the robot carrier 122 includes a vertical lift 124, where the vertical lift includes a vertical column 124a and a shelf 124b, where the shelf 124b is movably attached to the vertical column 124a, and extends radially outwards from the vertical column 124a. The shelf 124b is movable along a vertical direction. The robot 132 is mounted on the shelf 124b and is configured to assemble the frame 103. The positioner 112 is configured to support the frame 103 in a vertical position, or a primarily vertical position, during an assembling process of the frame 103.

The robot carrier 122 may further includes a rotary base 126. For example, the vertical lift 124 is attached to the rotary base 126. The base 126 has a base central axis 128, where the base 126 is configured to be rotatable around the base central axis 128. The robot carrier 122 is configured to support the robot 132. In this embodiment, the robot carrier 122 has 2 degrees of freedom, vertical movement and rotation. The robot carrier 122 has an independent rotation of the vertical lift column 124a. Since the base 126 is configured to be rotatable around the base central axis 128, the vertical column 124a mounted on the base 126 is rotatable around the base central axis 128 as well.

The robot 132 may have various axis configurations. For example, the robot 132 may have a robot base 132b and an arm 132a. The robot base 132b is mounted on the shelf 124b of the vertical lift 124. The robot 132 may have six axes, also called six degrees of freedom. The six axis robot 132 allows for greater maneuverability, and can perform a wider variety of manipulations than robots with fewer axes. In other configurations, however, fewer than six axes may be used. In some embodiments, the robot 132 has a first axis 138 located at the robot base 132b, allows the robot to rotate from side to side. The first axis 138 is the central axis 138 of the robot 132. The robot 132 is configured to rotate around the robot central axis 138. This axis 138 allows the robot 132 to spin up to or past a full 180 degree range from center, in either direction.

The robot 132 may have a second axis which allows the lower arm 132a of the robot 132 to extend forward and backward. It is the axis powering the movement of the entire lower arm 132a. The robot 132 may have a third axis which extends the robot's reach. It allows the upper arm to be raised and lowered. On some articulated models, it allows the upper arm to reach behind the body, further expanding the work envelope. This axis gives the upper arm the better part access. The robot 132 may have a fourth axis which aids in the positioning of the end effector and manipulation of the part to be assembled. The robot 132 may further have a fifth axis which allows the wrist of the robot arm to tilt up and down. The robot 132 may further have a sixth axis which is the wrist of the robot arm 132a.

In some embodiments, the robot central axis 138 is offset from the base central axis 128, as shown in FIG. 1A. The robot base 132b is mounted on the shelf 124b of the vertical lift 124. Since the shelf 124b is extending radially outwards from the base central axis 128, the robot central axis 138 has a distance from the base central axis 128. When the vertical lift 124 is rotatable around the base central axis 138, the shelf 124b is also rotatable around the base central axis 138. Thus, the robot 132 is further rotatable about an arc movement around the base central axis 128, in addition to being rotatable around the first axis 138 of the robot 132. This sweeping motion of robot base 132a about the base central axis 128 extends the work area of the robot 132 to include the area on either side, and behind the vertical axis 128. In this way, the robot 132 is capable of independently moving vertically up and down, rotating from side-to-side, and in a combination of the aforementioned movements. Therefore, the robot 132 is not limited to its own degrees of freedom. The robot 132 has a larger work envelope. The robot carrier 122 and the robot 132 together have eight degrees of freedom. The more degrees of freedom enables the manufacturer to use fewer robots, which can reduce cost and increase efficiency.

In some embodiments, the robot carrier 122 may include a control unit (not shown). The control unit is configured to control the robot carrier 122. The manufacturing cell 100 may further include a controller 185, which can be configured to control the robot carrier 122, the robot 132, the positioner 112, and controls for the rest of the system. The controller 185 can be configured to control an assembling process of the frame 103, for example, an automatic assembling process. The entire assembling process can be automated with high efficiency and low cost. In other embodiments, a central control station may communicate to the robot carrier 122 to issue instructions for the assembling process. In still other embodiments, the robot carrier 122 may be authorized to perform certain functions and make certain decisions on its own, while a central station or an on-site server may have control over other, potentially more important decisions which may be conveyed to the robot carrier 122 electronically or otherwise. In short, a wide variety of control automation configurations may be implemented into the system depending on the application and objectives, and each such configuration is intended to fall within the spirit and scope of the present disclosure.

Figure 1B:
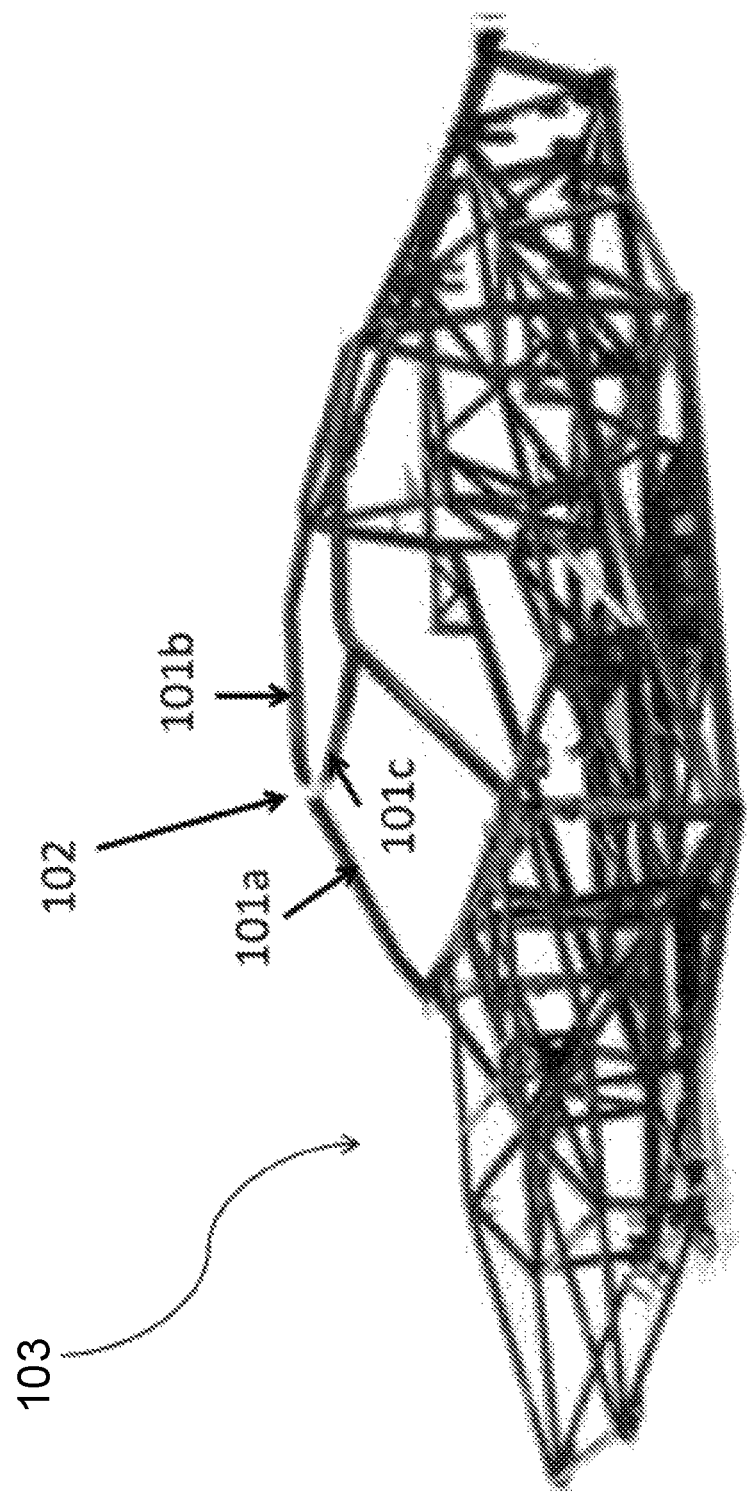
FIG. 1B illustrates an example of the frame in FIG. 1A.

FIG. 1B illustrates an example of the frame 103. The frame 103 can includes a plurality of connecting components 101a, 101b, 101c, a plurality of joint members 102, or nodes 102. For example, the joint members or nodes may be produced by a 3-D printer. Each joint member may be sized and shaped to mate with at least a subset of the plurality of the connecting components 101a, 101b, 101c to form a three-dimensional frame structure 103. The plurality of joint members 102 include mounting features, which provide panel mounts for mounting of panels on the three-dimensional frame structure 103. For example, the mounting features may be produced by a 3-D printer.

The frame 103 may form the framework of a vehicle. The frame 103 may provide the structure for placement of body panels of the vehicle, where body panels may be door panels, roof panels, floor panels, or any other panels forming the vehicle enclosure. Furthermore, the frame 103 may be the structural support for the wheels, drive train, engine block, electrical components, heating and cooling systems, seats, storage space, and other systems.

The vehicle may be a passenger vehicle capable of carrying at least about 1 or more, 2 or more, 3 or more, 4 or more, 5 or more, 6 or more, 7 or more, 8 or more, ten or more, twenty or more, or thirty or more passengers. Examples of vehicles may include, but are not limited to sedans, trucks, buses, vans, minivans, station wagons, RVs, trailers, tractors, go-carts, automobiles, trains, or motorcycles, boats, spacecraft, or airplanes. The frame may provide a form factor that matches the form factor of the type of vehicle. Depending on the type of vehicle, the frame may have varying configurations. The frame may have varying levels of complexity. In some instances, a three-dimensional frame may provide an outer framework for the vehicle. In some other instances, a three-dimensional frame may provide an inner framework for the vehicle. In yet some other instances, a three-dimensional frame may provide partially inner and partially outer framework for the vehicle. The framework may be configured to accept body panels to form a three-dimensional enclosure. Optionally, inner supports or components may be provided. The inner supports or components can be connected to the frame through connection to the one or more joint members of the frame. Different layouts of multi-port nodes and connecting components may be provided to accommodate different vehicle frame/chassis configurations. In some cases, a set of nodes can be arranged to form a single unique frame/chassis design. Alternatively at least a subset of the set of nodes can be used to form a plurality of frame/chassis designs. In some cases at least a subset of nodes in a set of nodes can be assembled into a first frame/chassis design and then disassembled and reused to form a second frame/chassis design. The first frame/chassis design and the second frame/chassis design can be the same or they can be different. Nodes may be able to support components in a two or three-dimensional plane. The details of the frame/chassis are described in U.S. patent application Ser. No. 15/253,826, U.S. Pat. Nos. 9,895,747, and 9,884,663, which are incorporated herein by reference in their entirety to the same extent as if each individual publication or patent application was specifically and individually indicated to be incorporated by reference.

In some other embodiments, the frame may include other types of frame or other features which include nodes, channels to inject adhesives, pick-up features which allow robots to pick up or otherwise manipulate portions or all of the frame, and tooling features built into the frame. The frame may be assembled entirely by robots, or by an automatic assembling process.

FIG. 2A is an illustration of a positioner 212 coupled to a fixture table 242, when the fixture table 242 is in one position. FIG. 2B illustrates the positioner 212 coupled to the fixture table 242, when the fixture table 242 is in another position. Referring to FIG. 2A and FIG. 2B, the positioner 212 is configured to support the fixture table 242. The fixture table 242 is configured to hold the frame 103, and to be coupled to the positioner 212.

The positioner 212 is configured to perform one or more of lifting the fixture table 242, tilting the fixture table 242, and rotating the fixture table 242. In some embodiments, the positioner 212 is a 3-axis positioner, which adds 3 degrees of freedom to the manufacturing cell. The positioner 212 can lift the fixture table 242 up and down, from and to the ground. The positioner 212 can further tilt the fixture table 242 from a horizontal position to a vertical position, and anywhere in between. In some embodiments, it can go beyond the horizontal and vertical positions. Moreover, the positioner 212 can rotate the fixture table 242 around a positional axis 118 (see FIG. 1A). For example, the fixture table 242 may further include a backbone (not shown), which is integrated with the fixture table. The backbone is configured to be coupled to the positioner 212 and may facilitate such rotations or other manipulating actions. The positioner 212 is capable of performing either independent movements, or dependent movements of all the aforementioned movements.

In some embodiments, the positioner 212 includes a 3-point kinematic mount 215 and a positioner base 219. The fixture table 242 may be secured to the positioner 212 with the 3-point kinematic mount 215. For example, the positioner 212 may be attached to the fixture table 242 by various fail-safe methods, including bolting or a zero-point quick release mechanism. For example, the positioner 212 may include one or more zero point pins to secure the fixture table 242 to the positioner 212. In some embodiments, a mechanical lock between the fixture table 242 and positioner 212 can be used to securely lock the fixture table 242 to the positioner 212. Therefore, the positioner 212 can support the fixture table 242 at various positions, including a vertical position, a horizontal position, and anywhere in between, as shown in FIG. 2A and FIG. 2B.

Figure 3B:
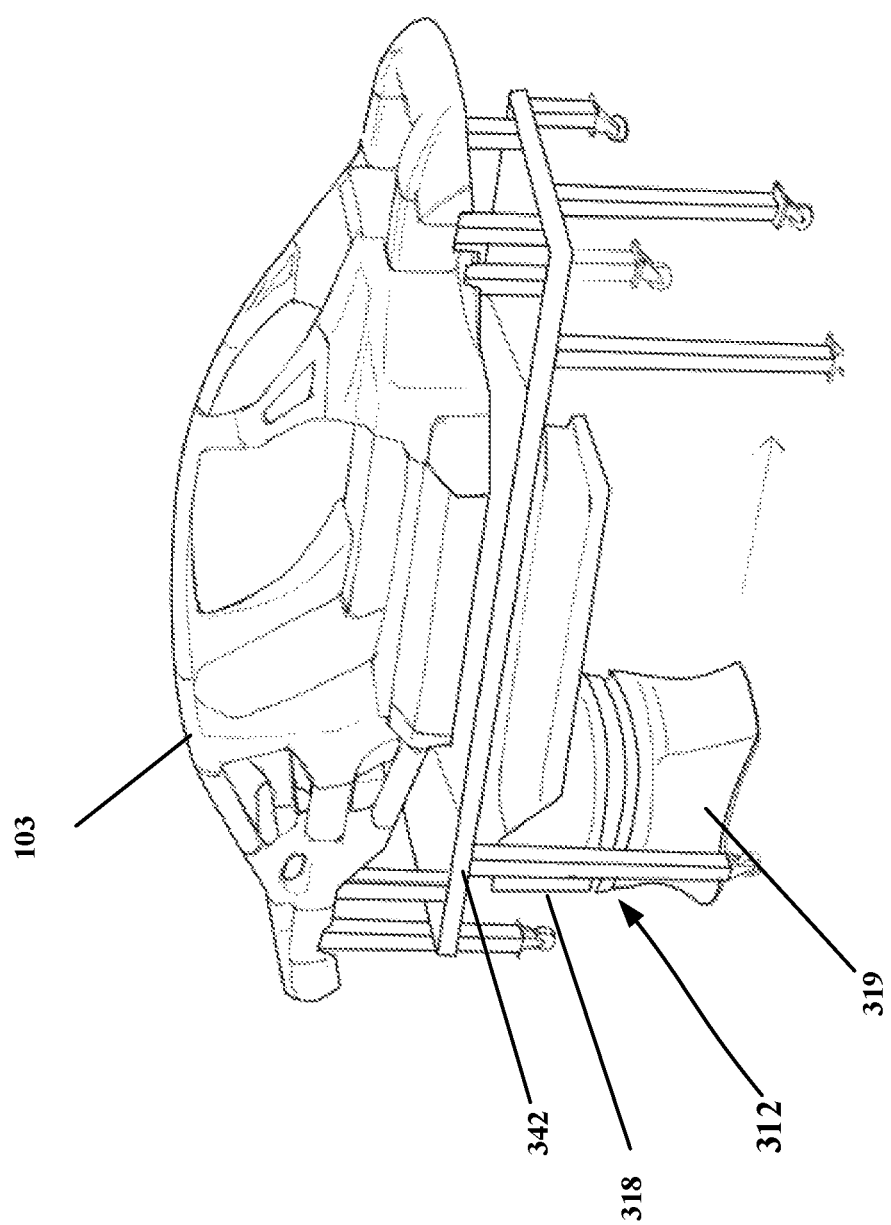
FIG. 3B illustrates a schematic of the another example positioner coupled to the fixture table, when the fixture table is in a horizontal position.

FIG. 3A illustrates another embodiment of a positioner 312 coupled to a fixture table 342, when the fixture table 342 is holding a frame 103 in a vertical position. FIG. 3B illustrates the positioner 312 coupled to the fixture table 342, when the fixture table 342 is in a horizontal position. For example, the positioner 312 may further includes a backbone 316. The backbone 316 is integrated with the positioner 312. The fixture table 342 is configured to be coupled to the backbone 316 of the positioner 312. As shown in FIG. 3A, the positioner 312 may further include an actuator 317, a positioner base 318, and a turntable 319.

As shown in FIG. 3A and FIG. 3B, the positioner 312 is configured to perform one or more of lifting the fixture table 342, tilting the fixture table 342, and rotating the fixture table 342. The positioner 312 is capable of performing either independent movements, or dependent movements of all the aforementioned movements. The backbone 316 of the positioner 312 is configured to be movable between a horizontal position and a vertical position. The positioner 312 can flip the fixture table 342 from a horizontal position to a vertical position, and vice versa. Moreover, the positioner 212 can rotate the fixture table 342 by rotating the turntable 319.

In an embodiment, the fixture table 342 as shown in FIG. 3A and FIG. 3B is a customized fixture table, which is configured to match different frame of different types of vehicles, or different models of the same type of vehicles. For example, the manufacturing cell can be used to manufacture different types of vehicles by using different fixture tables.

Figure 4:
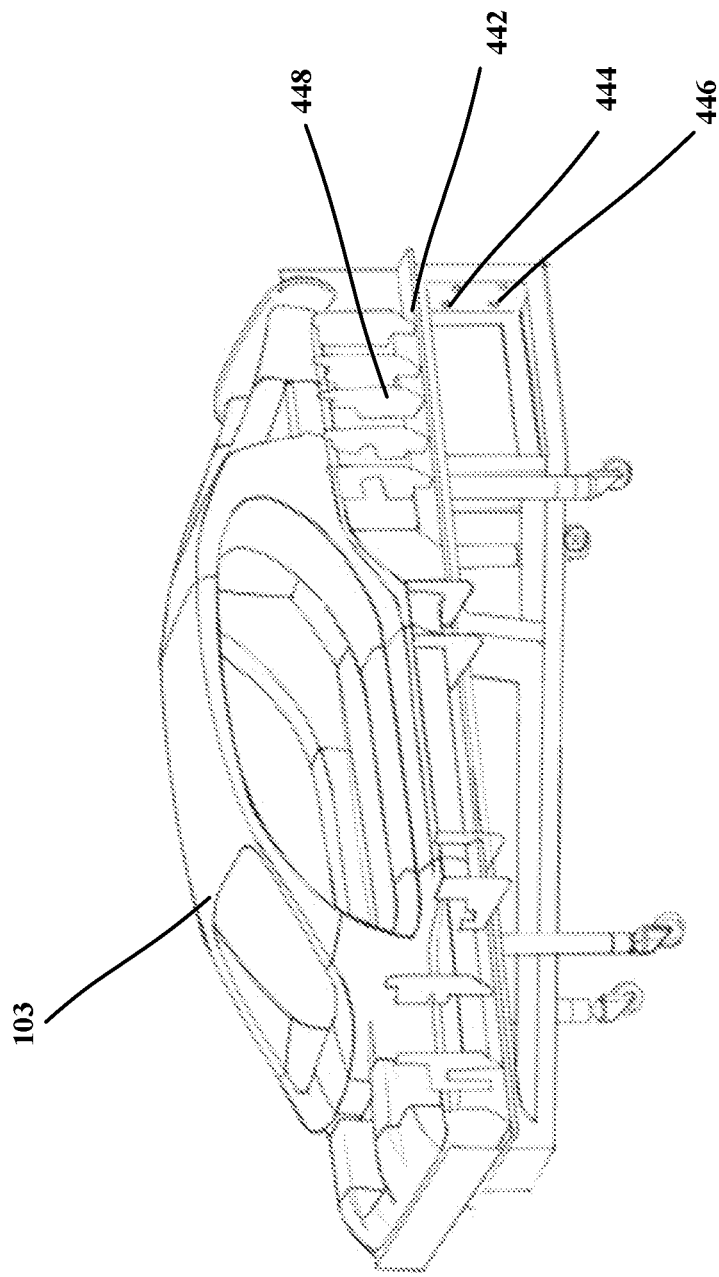
FIG. 4 illustrates a schematic of an example modular fixture table configured to hold a frame of a vehicle, according to one embodiment of this disclosure.

FIG. 4 is an illustration of a modular fixture table 442 configured to hold a frame 103 of a vehicle. The modular fixture table 442 includes a plurality of locating features 444 (e.g., holes) and securement features 446. The modular fixture table 442 further includes a plurality of movable support plates 448. The plurality of locating features 444 and securement features 446, and the plurality of movable support plates 448 provide the flexibility to match different frame of different types of vehicles, or different models of the same type of vehicles.

Referring generally to FIGS. 1A-4, the manufacturing cell 100 can assemble a plurality of frame with minimum tooling changeover (retooling). Customized or modular fixture tables can be used to accommodate different frame for a plurality of vehicles. When changing the models, or types, of the vehicles, the necessity for tooling changeover is limited. Thus, the manufacturing cell 100 can serve as a flexible universal constructor for a wide variety of vehicles. The effort for changing to a new model can be reduced, and the cycle for developing a new model can be shortened as well.

In addition, the manufacturing cell 100 is configured for volume production. The manufacturing cell 100 may have high robot utilization, where required, for high volumes. The manufacturing cell 100 can be configured to be fully automatic, for example. The automatic assembling process can significantly reduce the manufacturing effort of the frame, thereby enabling vehicles with the frame to be produced more efficiently and economically.

As shown in FIG. 1A, the positioner 112 is configured to support the fixture table 142 in a vertical position during an assembling process of the frame 103. Some advantages of the vertical manufacturing cell 100 include better accessibility, increased degrees of freedom, reduced footprint, fewer part transfer, reduced component count, and lower maintenance than conventional assembly or manufacturing technologies. The vertical space utilization can be maximized. The robots can access the frame from more angles, which can increase the efficiency of an assembling process of the frame 103.

In some embodiments, the manufacturing cell 100 may further include a second robot carrier 125 and a second robot 135. Both robots 132, 135 work together to assemble the frame 103, or parts thereof. For example, the second robot carrier 125 may be positioned at an opposite side of the positioner 112 than the robot carrier 122. For another example, the robot carrier 122 may be positioned at +45 degrees relative to the positioner 112, and the second robot carrier 125 may be positioned at −45 degrees relative to the positioner 112. The manufacturing cell 100 may further include one or more robot carriers. There is no limit to the number of robot carriers. There are also many configurations to place the one or more robot carriers. The examples discussed above are only for illustration purpose, and there is no limitation to the relative positions of the one or more robot carriers.

In some embodiments, the manufacturing cell 100 may further include one or more stationary robots 162. For example, each of the one or more stationary robots 162 may be placed on a corresponding pedestal 164, which elevates the stationary robot to a desired working height to enable greater accessibility and reach. The stationary robots 162 may perform a variety of tasks, such as assembling assemblies, subassemblies, assisting, etc.

As shown in FIG. 1A, the manufacturing cell 100 may offer twenty-five or more degrees of freedom, redundant or otherwise. The robot 132 may offer six degrees of freedom. The robot carrier 122 may offer two degrees of freedom. The positioner 112 may offer three degrees of freedom. The manufacturing cell 100 with one robot and one robot carrier may have eleven degrees of freedom. The second robot carrier 125 and the second robot 135 may offer an additional 8 degrees of freedom. The manufacturing cell 100 with two robots and two robot carriers may offer a total of nineteen degrees of freedom. When manufacturing cell 100 includes a stationary robot 162 with additional six degrees of freedom, there may be a total of twenty-five degrees of freedom. The manufacturing cell 100 can have a lower number of robots than would otherwise be necessary because of the large number of degrees of freedom. The manufacturing cell 100 offers agility and dexterity for assembling a frame of a wide variety of vehicles.

The manufacturing cell 100 allows for a plurality of robots to be positioned strategically inside the cell, enabling pooled work envelopes. The compact footprint of the manufacturing cell 100 further has the advantage of saving space. The manufacturing cell 100 may have various dimensions. For example, the manufacturing cell 100 may have an area between 400 square feet and 3600 square feet. The space of the manufacturing cell 100 can be significantly lower than the conventional assembly line for vehicles.

Moreover, the vertical manufacturing cell 100 enables robots to act as fixtures, in place of a customary stationary fixture, to thereby achieve an overall reduction or elimination of fixtures during the assembling process.

For example, the fixture table may have legs with wheels that enable movement on the floor, while holding the frame within the required tolerance.

Referring back to FIG. 1A, the manufacturing cell 100 can be configured to assemble, bond, fasten, and measure the frame 103. For example, the manufacturing cell 100 can be configured to assemble, apply adhesive, bolt, and measure the frame 103. The robot 132, 135 can be configured to perform multiple tasks, including, but not being limited to, assembling, bonding, fastening, and measuring the frame. For example, the arms 132a, 135a of the robots 132, 135 may be configured to be coupled to a plurality of end effectors. Each of the plurality of end effectors can be configured to perform different functions. The plurality of end effectors can be configured to be quickly exchanged. The manufacturing cell 100 further includes tool tables 172. The tool tables can be configured to hold the plurality of end effectors, or subassemblies, or parts, of the frame 103.

In some embodiments, the manufacturing cell 100 may include an adhesive injection subsystem. The robots 132, 135 are further configured to apply an adhesive to bond the frame 103. The adhesive injection subsystem may include adhesive injection end effectors 132c, 135c. The frame 103 includes a plurality of connecting components 101a, 101b, 101c, a plurality of joint members 102, or nodes 102 (FIG. 1B). Each joint member may be sized and shaped to mate with at least a subset of the plurality of the connecting components 101a, 101b, 101c to form a three-dimensional frame structure 103. The plurality of joint members 102, or nodes 102, may have built-in adhesive ports. For example, the robots 132, 135 of FIG. 1A may be configured to grab adhesive injection end effectors 132c, 135c. The arms 132a, 135a of the robots 132, 135 may be configured to be coupled to the adhesive injection end effectors 132c, 135c.

In some embodiments, the manufacturing cell 100 may include one or more fastener drivers (not shown). The robots 132, 135 are further configured to install fasteners to the frame 103 by using the fastener drivers. For example, the arms 132a, 135a of the robots 132, 135 may be configured to be coupled to end effectors for fastener drivers. The one or more fastener drivers may be attached to the arms 132a, 135a of the robots 132, 135, to reach all necessary locations, by leveraging all axes of freedom that the manufacturing cell 100 offers. The number of robots and fastener drivers needed may be minimized because of the better reach and accessibility offered by the increased number of degrees of freedom of the manufacturing cell 100.

In some embodiments, the manufacturing cell 100 may include one or more metrology devices (not shown). Metrology devices may include, for example, a laser scanner. The robots 132, 135 are further configured to measure multiple points on the frame 103 to perform a general measurement of the frame 103. For example, the arms 132a, 135a of the robots 132, 135 may be configured to be coupled to end effectors for metrology devices. The one or more metrology devices may be attached to the arms 132a, 135a of the robots 132, 135. For example, the robots 132, 135 may be configured to scan and measure the frame 103. As an example, the robots 132, 135 may be configured to measure the frame 103 by scanning the frame 103. As another example, the robots 132, 135 may be configured to measure the frame 103 by probing the frame 103. The vertical manufacturing cell 100 may advantageously ensure full access of the frame 103, avoiding need for additional components or hardware (e.g., overhead gantry rail system).

In some embodiments, the manufacturing cell 100 may include one or more subassembly robots and one or more subassembly tables. For example, each of the one or more subassembly robots may be configured to assemble a subassembly or subsection of the frame 103 on a corresponding subassembly table. The subassembly robots may pass the assembled subassemblies to the robots 132, 135 on the robot carriers 122, 125. The robots 132, 135 may assemble the frame 103 from the subassemblies. The one or more subassembly robots may enable concurrent assembling and therefore may further reduce the overall time of the assembling process.

For example, the manufacturing cell 100 may include one or more tool changers. The tool changers are configured to exchange the plurality of end effectors for the robots. For example, tool changers may be used to switch from specially designed end effectors for assembly, scanning heads for measurements, fastener drivers for bolt installations, and adhesive injection end effectors for adhesive and sealer applications.

As shown in FIG. 1A, the manufacturing cell 100 may be surrounded by safety barrier 194 with safety sensors, and interlocks. For example, the safety barrier 194 enable the fixture table 142 holding the frame 103 to enter the manufacturing cell 100 and exit the manufacturing cell 100, and further provide a safety measure to the manufacturing cell 100. For example, when the safety sensors detect an unexpected violation, the safety sensors may send signals to the controller 185 to safely halt the assembling process. Accordingly, if an individual inadvertently enters the manufacturing cell 100, the controller 185 may safely halt the assembling process which in turn may render stationary the currently moving parts that may otherwise be dangerous and may cause significant harm to the individual. In sum, harm may be avoided using the safety barrier 194. In some embodiments, the safety barrier 194 includes photoelectric light presence sensors.

The manufacturing cell 100 offers agility and dexterity with reduced duplication of bonding, fastening, and measurement equipment. Scalability of the manufacturing cell 100 can be accomplished through the addition of derivative manufacturing cells to the vertical manufacturing cell 100, or decoupling of fastening, bonding, and or measurement operations. Scalability can also be achieved through duplication of the manufacturing cells in series or parallel, or a combination of the two. Flexibility can be attained through the robots' use of a virtually unlimited number of customized end effectors and other tools for performing a wide variety of specialized operations on the vehicle.

FIG. 5 illustrates a flow diagram of a method 500 for manufacturing a vehicle. The method 500 for manufacturing a vehicle includes a step 502 of receiving a fixture table by a positioner. The method 500 can include supporting the fixture table with the positioner 504. The method 500 can further include introducing parts to the fixture table 506. The method includes a step 508 of assembling a frame of the vehicle using the parts by a robot in an assembling process inside a manufacturing cell. The method 500 further includes a step 510 of controlling the assembling process by a controller.

For example, the step 504 of supporting the fixture table with the positioner includes supporting the fixture table in a vertical position with the positioner during the assembling process.

The method 500 includes the step 508 of assembling the frame by a robot inside a manufacturing cell. The method 500 may further include moving the robot along a vertical direction by placing the robot on a vertical lift. The method 500 may include moving the robot along an arc by placing the vertical lift on a base rotatable around a central base axis. The method 500 may include performing one or more of lifting the fixture table, tilting the fixture table, and rotating the fixture table by the positioner. In some embodiments, the method 500 may include assembling the frame by a second robot.

The method 500 further includes supporting the frame by the positioner during the assembling process inside the manufacturing cell. For example, the method 500 of supporting the frame by the positioner may comprise supporting the frame in a vertical position by the positioner during the assembling process. There are many advantageous to assemble the frame in the vertical position, such as easy accessibility, large degrees of freedom, a compact footprint, low moving parts and convenient maintenance. The overhead space can be utilized. The robots can access the frame from many angles, which can increase the efficiency of the assembling process of the frame.

The method 500 further includes a step 510 of controlling the assembling process by a controller. The entire assembling process of assembling the frame may include high robot utilization, and can be fully automated in some embodiments. Further attributes and advantages of the controlling step 510 are described throughout this disclosure.

The method 500 may include applying an adhesive to bond together sections of the frame by the robot during the assembling process inside the manufacturing cell. Further, the method 500 may include installing fasteners to the frame by the robot using a fastener driver during the assembling process inside the manufacturing cell. The method 500 may also include measuring multiple points on the frame for measurement of the frame by the robot through a metrology device inside the manufacturing cell during the assembling process. The method 500 may include using a safety sensor to provide safety measure to the manufacturing cell. The method 500 may also include assembling one or more subassemblies of the frame by one or more subassembly robots on one or more subassembly tables inside the manufacturing cell. It will be appreciated that the above are merely non-exhaustive examples of the wide variety of tasks that the robots or other devices can undertake during the assembling process.

Advantageously, the systems and methods disclosed herein are modular in design and flexible for manufacturing a wide variety of vehicles. Newly developed products only require minimal retooling, resulting in significantly lower new product development efforts, and a reduced R&D cycle.

Notably, the manufacturing cell based systems and methods involve high robot utilization and a potentially fully automatic manufacturing process, which lead to the possibility of cost effective mass production. Thus, the manufacturing cell based systems and methods significantly lower the manufacturing efforts of the vehicles.

Importantly, the frame design results in weight savings and enables easier repair and service. The manufacturing cell enables easy assembling in a small space, which significantly saves overall manufacturing space. Therefore, the manufacturing cell based systems and methods provide a new platform for manufacturing vehicles.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for assembling a frame. Thus, the claims are not intended to be limited to the exemplary embodiments presented throughout the disclosure, but are to be accorded the full scope consistent with the language claims.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A manufacturing cell configured for assembling a frame of a vehicle, the manufacturing cell comprising:
   a positioner configured to receive a fixture table, wherein the fixture table is configured to hold the frame;
   a robot carrier comprising a vertical lift mounted on a base, wherein the vertical lift comprises a vertical column and a shelf, wherein the shelf is movably attached to the vertical column and is movable along a vertical direction, and wherein the base has a base central axis, wherein the vertical lift and the base are configured to be independently rotatable around the base central axis during an assembling process of the frame; and
   a robot mounted on the shelf and configured to assemble the frame;
   wherein the positioner is configured to lift the fixture table up and down, to rotate the fixture table around a positional axis, and to tilt the fixture table to support the frame anywhere between a vertical position and a horizontal position during the assembling process of the frame.

2. The manufacturing cell of claim 1, wherein the robot has six degrees of freedom, and wherein the robot carrier and the robot have eight degrees of freedom together.

3. The manufacturing cell of claim 1, wherein the robot carrier further comprises a control unit, and wherein the control unit is configured to control the robot carrier.

4. The manufacturing cell of claim 1, wherein the positioner is configured to rotate the fixture table.

5. The manufacturing cell of claim 1, wherein the positioner further comprises a three point kinematic mount.

6. The manufacturing cell of claim 1, further comprising a mechanical lock, wherein the mechanical lock is configured to lock the fixture table to the positioner, and wherein the positioner is configured to support the fixture table at the vertical position, the horizontal position, and anywhere between the vertical position and the horizontal position.

7. The manufacturing cell of claim 1, wherein the positioner further includes a backbone, and wherein the backbone is configured to be movable from the horizontal position to the vertical position.

8. The manufacturing cell of claim 1, wherein the fixture table further includes a backbone, and wherein the backbone is configured to be coupled to the positioner.

9. The manufacturing cell of claim 1, further comprising a second robot carrier.

10. The manufacturing cell of claim 1, further comprising a fastener driver, wherein the robot further comprises an arm, and wherein the fastener driver is attached to the arm of the robot, wherein the robot is further configured to install fasteners to the frame by using the fastener driver.

11. The manufacturing cell of claim 1, further comprising a metrology device, wherein the robot further comprises an arm, and wherein the metrology device is attached to the arm of the robot, wherein the robot is further configured to measure multiple points on the frame for measurement of the frame by using the metrology device.

12. The manufacturing cell of claim 1, further comprising a tool changer and a plurality of end effectors, and wherein the tool changer is configured to exchange the plurality of end effectors for the robot.

13. The manufacturing cell of claim 1, further comprising one or more stationary robots.

14. The manufacturing cell of claim 1, further comprising a tool table and a plurality of end effectors, and wherein the tool table is configured to hold the plurality of end effectors.

15. The manufacturing cell of claim 1, further comprising a controller configured to control the assembling process of the frame.

16. The manufacturing cell of claim 1, further comprising a safety sensor configured to provide a safety measure to the manufacturing cell.

17. The manufacturing cell of claim 1, further comprising one or more subassembly robots and one or more subassembly tables, wherein each of the one or more subassembly robots is configured to assemble a subassembly of the frame on a corresponding one of the one or more subassembly tables.

18. The manufacturing cell of claim 1, wherein the fixture table comprises a modular fixture table including a plurality of locating and securement features, and a plurality of movable support plates.

19. The manufacturing cell of claim 1, wherein the robot has a robot central axis, wherein the robot is configured to rotate around the robot central axis.

20. The manufacturing cell of claim 19, wherein the robot central axis is offset from the base central axis such that the robot is further rotatable about an arc movement around the base central axis.

21. The manufacturing cell of claim 1, wherein the robot is further configured to apply an adhesive to bond the frame.

22. The manufacturing cell of claim 21, further comprising an adhesive injection subsystem, the adhesive injection subsystem comprises a plurality of adhesive injection end effectors.

23. A system for manufacturing a vehicle, the system comprising:
- a fixture table configured to hold a frame of the vehicle;
- a manufacturing cell configured for assembling the frame, the manufacturing cell comprising:
  - a positioner configured to receive the fixture table,
  - a robot carrier comprising a vertical lift mounted on a base wherein the base has a base central axis, wherein the vertical lift and the base are configured to be independently rotatable around the base central axis during an assembling process of the frame,
  - a robot mounted on the robot carrier and configured to assemble the frame; and
- a controller configured to control the assembling process of the frame;
- wherein the positioner is configured to lift the fixture table up and down, to rotate the fixture table around a positional axis, and to tilt the fixture table to support the frame anywhere between a vertical position and a horizontal position during the assembling process of the frame.

24. The system of claim 23, wherein the vertical lift of the robot carrier comprises a vertical column and a shelf movably attached to the vertical column, wherein the shelf is movable along a vertical direction, and wherein the robot is mounted on the shelf.

25. The system of claim 23, wherein the positioner further comprises a three point kinematic mount.

26. The system of claim 23, wherein the manufacturing cell further comprises a mechanical lock, wherein the mechanical lock is configured to lock the fixture table to the positioner, and wherein the positioner is configured to support the fixture table at the vertical position, and the horizontal position, and anywhere between the vertical position and the horizontal position.

27. The system of claim 23, wherein the positioner further includes a backbone, and wherein the backbone is configured to be movable from the horizontal position to the vertical position.

28. The system of claim 23, wherein the fixture table further includes a backbone, and wherein the backbone is configured to be coupled to the positioner.

29. The system of claim 23, wherein the manufacturing cell further comprises a second robot carrier.

30. The system of claim 23, wherein the robot is further configured to apply an adhesive to bond the frame.

31. The system of claim 23, wherein the robot further comprises an arm, the manufacturing cell further comprises a fastener driver attached to the arm of the robot, and the robot is further configured to install fasteners to the frame by using the fastener driver.

32. The system of claim 23, wherein the manufacturing cell further comprises a metrology device configured to measure multiple points on the frame for measurement of the frame.

33. The system of claim 23, wherein the manufacturing cell further comprises a tool changer and a plurality of end effectors, and wherein the tool changer is configured to exchange the plurality of end effectors for the robot.

34. The system of claim 23, wherein the manufacturing cell further comprises one or more stationary robots.

35. The system of claim 23, wherein the manufacturing cell further comprises a tool table and a plurality of end effectors, and wherein the tool table is configured to hold the plurality of end effectors.

36. The system of claim 23, wherein the manufacturing cell further comprises a safety sensor configured to provide safety measure to the manufacturing cell.

37. The system of claim 23, wherein the manufacturing cell further comprises one or more subassembly robots and one or more subassembly tables, wherein each of the one or more subassembly robots is configured to assemble a subassembly of the frame on a corresponding one of the one or more subassembly tables.

38. The system of claim 23, wherein the fixture table comprises a modular fixture table including a plurality of locating and securement features, and a plurality of movable support plates.

39. The system of claim 23, further comprising the frame, wherein the frame comprises a plurality of connecting components and a plurality of joint members, and wherein each joint member is sized and shaped to mate with at least a subset of the plurality of connecting components to form a three-dimensional frame structure.

40. The system of claim 23, wherein the positioner is configured to rotate the fixture table.

41. The system of claim 40, further comprising an adhesive injection subsystem, the adhesive injection subsystem comprises a plurality of adhesive injection end effectors.

* * * * *